(12) United States Patent
Jiang

(10) Patent No.: US 7,496,090 B2
(45) Date of Patent: Feb. 24, 2009

(54) INBOUND ROAMER MULTIMEDIA MESSAGING SYSTEMS

(75) Inventor: Yue Jun Jiang, Danville, CA (US)

(73) Assignee: Roamware Inc., San Jose, CA (US)

( * ) Notice: Subject to any disclaimer, the term of this patent is extended or adjusted under 35 U.S.C. 154(b) by 567 days.

(21) Appl. No.: 11/076,687

(22) Filed: Mar. 10, 2005

(65) Prior Publication Data

US 2005/0233740 A1 Oct. 20, 2005

Related U.S. Application Data

(60) Provisional application No. 60/551,716, filed on Mar. 10, 2004.

(51) Int. Cl.
*H04L 12/66* (2006.01)

(52) U.S. Cl. .................. 370/354; 370/338; 370/352; 370/401

(58) Field of Classification Search .................. None
See application file for complete search history.

(56) References Cited

U.S. PATENT DOCUMENTS

| | | |
|---|---|---|
| 5,353,328 A | 10/1994 | Jokimies |
| 5,586,166 A | 12/1996 | Turban |
| 5,742,910 A | 4/1998 | Gallant et al. |
| 5,764,730 A | 6/1998 | Rabe et al. |
| 5,818,824 A | 10/1998 | Lu et al. |
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |

(Continued)

FOREIGN PATENT DOCUMENTS

CA 2281041 A1 2/2001

(Continued)

OTHER PUBLICATIONS

Digital cellular telecommunications systems (Phase 2+); Specification of the SIM Application Toolkit for the Subscriber Identity Module-Mobile Equipment (SIM-ME) Interface (GSM 11,14 version 8.3.0 Release 1999 STSI TS 101 267 V8.3.0, XX, XX, Aug. 2000, pp. 1-69 and pp. 114-115 (XP-002222021).

(Continued)

*Primary Examiner*—Duc C Ho
(74) *Attorney, Agent, or Firm*—Arent Fox LLP

(57) ABSTRACT

Inbound Roamer Multimedia Messaging Systems ("IRMMS") are described that transfer Welcome Multimedia Messages ("MM") ("WMM") or Welcome Roaming Content ("WRC") to devices of inbound roamers. The IRMMS transfers MMs to inbound roamers without involving components of the corresponding home network (HPMN). The MMs include text messages, music clips, voice clips, video clips, photographs, and drawings, but are not so limited. Use of the IRMMS eliminates payment by a VPMN with which a subscriber is roaming to the subscriber's HPMN because components of the HPMN are not included in the transfer of the MMs. Thus, charges typically incurred by the VPMN for transmission of free WMM/WRC sent to the inbound roamer via the HPMN are avoided.

42 Claims, 10 Drawing Sheets

U.S. PATENT DOCUMENTS

| | | | |
|---|---|---|---|
| 5,953,653 A | 9/1999 | Josenhans et al. | |
| 5,987,318 A | 11/1999 | Alperovich et al. | |
| 5,987,323 A | 11/1999 | Huotori | |
| 5,987,325 A | 11/1999 | Tayloe | |
| 6,014,561 A | 1/2000 | Mölne | |
| 6,052,604 A | 4/2000 | Bishop et al. | |
| 6,058,309 A | 5/2000 | Huang et al. | |
| 6,075,855 A | 6/2000 | Christiansen et al. | |
| 6,085,084 A | 7/2000 | Christmas | |
| 6,138,005 A | 10/2000 | Park | |
| 6,138,009 A | 10/2000 | Birgerson | |
| 6,148,197 A | 11/2000 | Bridges et al. | |
| 6,163,701 A | 12/2000 | Saleh et al. | |
| 6,185,295 B1 | 2/2001 | Frederiksen et al. | |
| 6,185,436 B1 | 2/2001 | Vu | |
| 6,192,255 B1 | 2/2001 | Lewis et al. | |
| 6,195,532 B1 | 2/2001 | Bamburak et al. | |
| 6,208,864 B1 | 3/2001 | Agrawal et al. | |
| 6,212,372 B1 | 4/2001 | Julin | |
| 6,356,755 B1 | 3/2002 | Valentine et al. | |
| 6,356,756 B1 | 3/2002 | Koster | |
| 6,456,845 B1 | 9/2002 | Drum et al. | |
| 6,456,859 B1 | 9/2002 | Desblancs et al. | |
| 6,463,298 B1 | 10/2002 | Sorensen et al. | |
| 6,466,786 B1 | 10/2002 | Wallenius | |
| 6,505,050 B1 | 1/2003 | Brudos et al. | |
| 6,515,974 B1 | 2/2003 | Inoue et al. | |
| 6,574,481 B1 | 6/2003 | Rathnasapathy et al. | |
| 6,603,761 B1 | 8/2003 | Wang et al. | |
| 6,603,968 B2 | 8/2003 | Anvekar et al. | |
| 6,611,516 B1 | 8/2003 | Pirkola et al. | |
| 6,628,934 B2 | 9/2003 | Rosenberg et al. | |
| 6,636,502 B1 * | 10/2003 | Lager et al. | 370/352 |
| 6,671,523 B1 | 12/2003 | Niepel et al. | |
| 6,684,073 B1 | 1/2004 | Joss et al. | |
| 6,693,586 B1 | 2/2004 | Walters et al. | |
| 6,738,622 B1 | 5/2004 | Stadelmann et al. | |
| 6,738,636 B2 | 5/2004 | Lielbridis | |
| 6,764,003 B1 | 7/2004 | Martschitsch et al. | |
| 6,782,264 B2 | 8/2004 | Anderson | |
| 6,795,444 B1 | 9/2004 | Vo et al. | |
| 6,856,818 B1 | 2/2005 | Ford | |
| 6,876,860 B1 | 4/2005 | Berg et al. | |
| 6,920,487 B2 | 7/2005 | Sofer et al. | |
| 6,925,299 B1 | 8/2005 | Sofer et al. | |
| 6,961,559 B1 | 11/2005 | Chow et al. | |
| 6,963,543 B2 | 11/2005 | Diep et al. | |
| 6,968,383 B1 | 11/2005 | Heutschi et al. | |
| 6,975,852 B1 | 12/2005 | Sofer et al. | |
| 6,978,156 B1 | 12/2005 | Papadopoulos et al. | |
| 7,020,479 B2 | 3/2006 | Martschitsch | |
| 7,139,570 B2 | 11/2006 | Elkarat et al. | |
| 7,184,764 B2 | 2/2007 | Raviv et al. | |
| 7,231,431 B2 | 6/2007 | Sofer et al. | |
| 2002/0009199 A1 | 1/2002 | Ala-Laurila et al. | |
| 2002/0012351 A1 | 1/2002 | Sofer et al. | |
| 2002/0037708 A1 | 3/2002 | McCann et al. | |
| 2002/0087631 A1 | 7/2002 | Sharma | |
| 2002/0101858 A1 | 8/2002 | Stuart et al. | |
| 2002/0101859 A1 | 8/2002 | Maclean | |
| 2002/0160763 A1 | 10/2002 | Mittal et al. | |
| 2002/0187701 A1 | 12/2002 | Souissi | |
| 2002/0191575 A1 | 12/2002 | Kalavade et al. | |
| 2002/0196775 A1 | 12/2002 | Huotori | |
| 2003/0017843 A1 | 1/2003 | Noblins | |
| 2003/0050047 A1 | 3/2003 | Ala-Luukko | |
| 2003/0051041 A1 | 3/2003 | Kalavade et al. | |
| 2003/0064723 A1 | 4/2003 | Thakker | |
| 2003/0069922 A1 | 4/2003 | Arunachalam | |
| 2003/0129991 A1 | 7/2003 | Allison et al. | |
| 2003/0133421 A1 | 7/2003 | Sundar Rangamani et al. | |
| 2003/0139180 A1 | 7/2003 | McIntosh et al. | |
| 2003/0208560 A1 | 11/2003 | Inoue | |
| 2003/0224795 A1 | 12/2003 | Wilhoite et al. | |
| 2003/0229791 A1 | 12/2003 | De Jong | |
| 2004/0019539 A1 | 1/2004 | Raman et al. | |
| 2004/0053610 A1 | 3/2004 | Kim | |
| 2004/0082346 A1 * | 4/2004 | Skytt et al. | 455/456.3 |
| 2004/0087305 A1 | 5/2004 | Jiang | |
| 2004/0120552 A1 | 6/2004 | Borngraber et al. | |
| 2004/0131023 A1 | 7/2004 | Auterinen | |
| 2004/0132449 A1 | 7/2004 | Kowarch | |
| 2004/0148400 A1 * | 7/2004 | Mostafa | 709/227 |
| 2004/0196858 A1 * | 10/2004 | Tsai et al. | 370/401 |
| 2004/0224680 A1 | 11/2004 | Jiang | |
| 2004/0229601 A1 | 11/2004 | Zabawskyj et al. | |
| 2004/0236836 A1 | 11/2004 | Appleman | |
| 2005/0021834 A1 | 1/2005 | Coulombe | |
| 2005/0047378 A1 | 3/2005 | Wuschke et al. | |
| 2005/0064883 A1 | 3/2005 | Heck et al. | |
| 2005/0070278 A1 | 3/2005 | Jiang | |
| 2005/0186939 A1 * | 8/2005 | Barnea et al. | 455/405 |
| 2005/0186960 A1 | 8/2005 | Jiang | |
| 2005/0186979 A1 | 8/2005 | McCann et al. | |
| 2005/0192007 A1 | 9/2005 | Kumar et al. | |
| 2005/0192036 A1 | 9/2005 | Jiang | |
| 2005/0215250 A1 | 9/2005 | Chava et al. | |
| 2005/0232282 A1 | 10/2005 | Silver et al. | |
| 2005/0250493 A1 | 11/2005 | Elkarat et al. | |
| 2006/0003775 A1 | 1/2006 | Bull et al. | |
| 2006/0009204 A1 | 1/2006 | Ophir | |
| 2006/0025129 A1 | 2/2006 | Wolfman et al. | |
| 2006/0052113 A1 | 3/2006 | Ophir et al. | |
| 2006/0068778 A1 | 3/2006 | Della-Torre | |
| 2006/0068786 A1 | 3/2006 | Florence | |
| 2006/0079225 A1 | 4/2006 | Wolfman et al. | |
| 2006/0079236 A1 | 4/2006 | Del Pino et al. | |
| 2006/0148459 A1 | 7/2006 | Wolfman et al. | |
| 2006/0205404 A1 | 9/2006 | Gonen et al. | |
| 2006/0211420 A1 | 9/2006 | Ophir et al. | |
| 2007/0021118 A1 | 1/2007 | Ophir et al. | |
| 2007/0049269 A1 | 3/2007 | Ophir et al. | |
| 2007/0054665 A1 | 3/2007 | Elkarat et al. | |
| 2007/0072587 A1 | 3/2007 | Della-Torre et al. | |
| 2007/0178885 A1 | 8/2007 | Lev et al. | |
| 2007/0232300 A1 | 10/2007 | Wolfman | |
| 2007/0259663 A1 | 11/2007 | Weintraub et al. | |
| 2008/0020760 A1 | 1/2008 | Elkarat et al. | |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/18156 | 3/2000 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 01/65884 A1 | 9/2001 |
| WO | WO 02/41641 A2 | 5/2002 |
| WO | WO 02/19667 | 7/2002 |
| WO | WO 03/019960 A1 | 3/2003 |
| WO | WO 03/019969 A1 | 3/2003 |
| WO | WO 03/043367 A | 5/2003 |
| WO | WO 03/065660 A | 8/2003 |
| WO | WO2004/075598 | 9/2004 |
| WO | WO 2004/081802 | 9/2004 |
| WO | WO2005/101857 | 10/2005 |

| WO | WO2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 26.060 Version 5.4.0 Release 5)" ETSI TS 123 060 V5.4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brunen, M. "Romaing im Zugangsnetz Mit OWLAN uberall zu Hause sein," Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification3rd Generation Partnership Project; Technical Specification Group Services and System Aspects; Service accessibility (Release 1999).
Signaling procedure and the Mobile Application Part (MAP) (Release 1999).
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; 3rd Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; 3rd Generation Partnership Project; Technical Specification Group Services and System Aspects; Service accessibility (Release 1999).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
3G TS 22.078 version 3.2.0 Release 1999 UMTS CAMEL.
"Digital cellular telecommunications system (Phase 2+); Specification of the SIM Application Toolkit for the Subscriber Identity Module-Mobile Equipment (SIM-ME) interface (GSM 11.14 version 8.3.0 Release 1999)" ETSI TS 101 267 V8.3.0, Aug. 2000, pp. 1-69 and pp. 114-115 (XP-002222021).
"Digital cellular telecommunications system (Phase 2+); Universal Mobile Telecommunications System (UMTS); General Packet Radio Service (GPRS) Service description; Stage 2 (3GPP TS 23.060 version 5.4.0 Release 5)" ETSI TS 123 060 V5.4.0, Dec. 2002, pp. 1-207 (XP-014007573).
"Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 5.4.0 Release 5)" ETSI TS 129 060 V5.4.0, Dec. 2002, pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brünen, M. "Roaming im Zugangsnetz Mit OWLAN überall zu Hause sein," Net—Zeitschrift Fuer Kommunikationsmanagement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001124094).
Salkintzis, et al., "WLAN-GPRS Integration for Next-Generation Mobile Data Networks," IEEE Wireless Communications, Oct. 2002, pp. 112-123 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

* cited by examiner

INBOUND ROAMER MULTIMEDIA MESSAGING SYSTEMS

RELATED APPLICATION

This application claims the benefit of U.S. patent application Ser. No. 60/551,716, filed Mar. 10, 2004. This application also relates to U.S. patent application Ser. No. 10/635,804, filed Aug. 5, 2003.

TECHNICAL FIELD

The disclosure herein relates to portable communication networks and devices.

BACKGROUND

There are many mobile or cellular network operators, or providers, in the world, often more than one in a single country. These network operators include, but are not limited to, operators who provide mobility services using a variety of protocols (e.g., GSM, GPRS, 3G, CDMA, TDMA, etc.) or their variants. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

When the subscriber is registered in the network with which it has a direct billing relationship, the serving network is often referred to as the Home Public Mobile Network ("HPMN"). If the subscriber is in a network with which it does not have a direct billing relationship, the serving network is referred to as the Visited Public Mobile Network ("VPMN"), and the subscriber is referred to as an "inbound roamer" by the VPMN. The same subscriber is referred to as an "outbound roamer" by the HPMN. In such a case, the inbound roamers are treated as temporary subscribers from a service availability perspective, while the billing for usage incurred by them is through inter-carrier settlements via the HPMN of the subscriber.

The provision of Welcome Multimedia Messages ("MM") ("WMM") or Welcome Roaming Content ("WRC") to roamers or roaming subscribers by Multimedia Messaging Services ("MMS") is typically limited to outbound roamers. This limitation is a result of WMMs/WRCs being sent to (directly or via MMS internetworking) and retrieved from the HPMN MMSC or HPMN WAP gateway of the roamer using the HPMN GGSN. The WMM/WRC for outbound roamers is therefore handled entirely by the HPMN MMSC or HPMN WAP gateway involving the HPMN GGSN because the HPMN components know the GPRS/MMS/internet subscription of the roamers. However, because of the network components involved, costs are incurred when WMM/WRC are provided to inbound roamers.

Welcome SMS messages for inbound roamers are sent directly by a VPMN without involvement of the roaming subscriber's HPMN, and hence the VPMN absorbs the cost without paying the HPMN. Unlike SMS, which is a pure push service, the MMS is a push service for MMS/WAP-push alert and a pull service for MMS or WML-content retrieval service. With WMM/WRC for inbound roamers, in contrast, because it has to be delivered from the HPMN MMSC/WAP-Gateway via the HPMN GGSN, MMSC and WAP-gateway, the VPMN is required to pay the HPMN for the cost even though it cannot charge the inbound roamers for the WMM/WRC. Therefore, when the inbound roamer retrieves the WMM/WRC from the HPMN via the HPMN GGSN, MMSC and WAP gateway, the retrieval incurs costs at the HPMN network. These costs would typically need to be passed to the roamer by the VPMN with which the roamer is roaming, and since typical VPMNs might find these costs unjustifiable, the VPMNs are reluctant to charge inbound roamers for the WMM/WRC.

Therefore, unlike mobile terminated ("MT") SMS which is generally provided to subscribers free of charges, MT WMM/WRC for inbound roamers incurs GPRS cost at the VPMN, and the VPMN thus bills the HPMN to recover the cost. Consequently, there is a need for service providers to provide WMM/WRC to inbound roamers without involving network elements of the roaming subscriber's HPMN.

Incorporation by Reference

Each publication and patent application mentioned in this specification is herein incorporated by reference in its entirety to the same extent as if each individual publication or patent application was specifically and individually indicated to be incorporated by reference.

ACRONYMS

Figure 1:
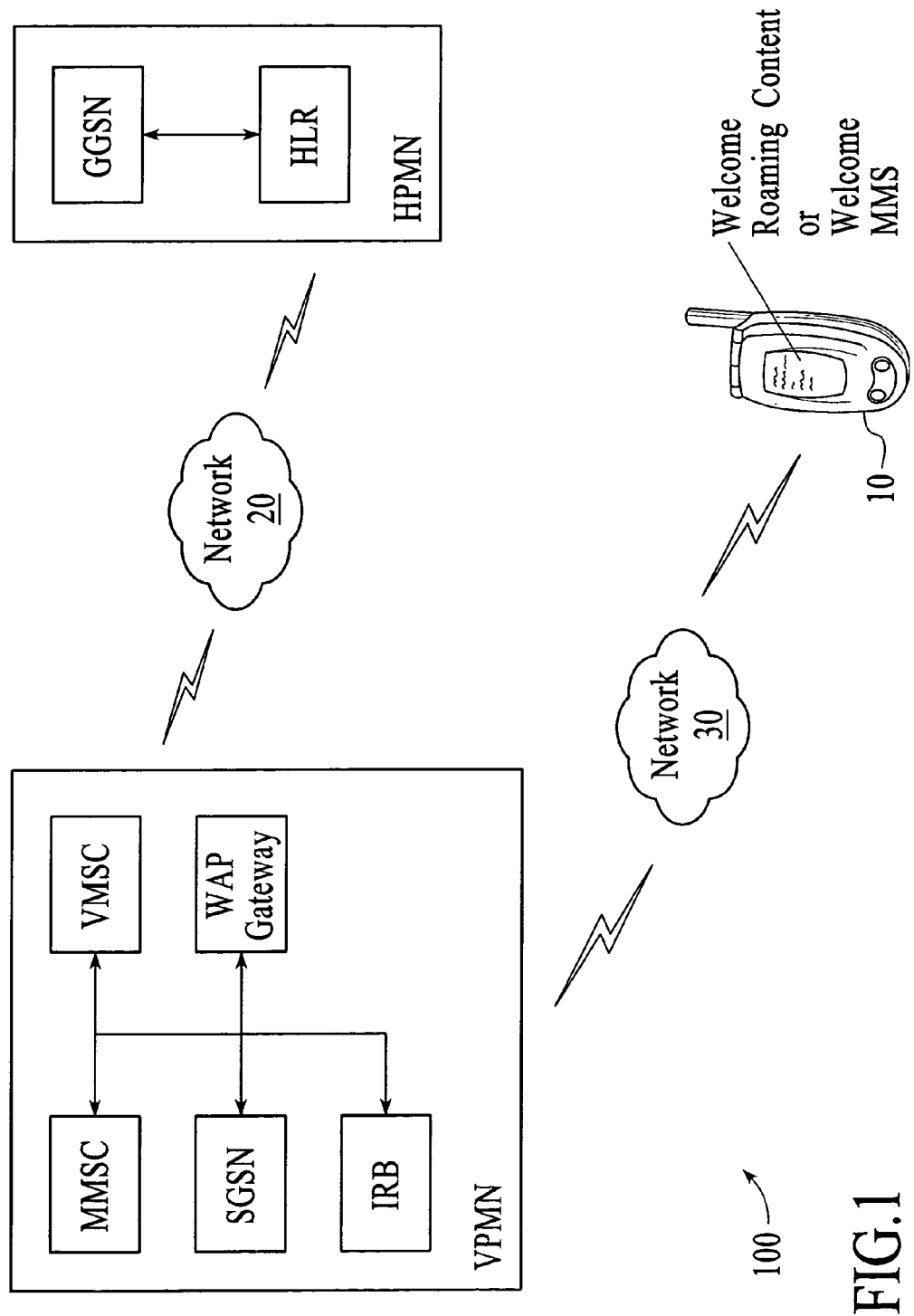
FIG. 1 is a diagram of a communication system that includes a VPMN that transfers MMs to inbound roamers without involving components of the roamer's HPMN, under an embodiment.

Signal Packet Relay System (SPRS);
Simple GPRS Roaming (SGR);
General Packet Radio Service (GPRS);
Access Point Name (APN);
Session Initiation Request (SIA);
Country Code (CC);
Network Destination Code (NDC);
Mobile Country Code (MCC);
Mobile Network Code (MNC);
Signal Transfer Point (STP);
Global Title Transaction (GTT);
Home Location Register (HLR);
HLR from HPMN (HLR-H);
Visit Location Register (VLR);
VLR from VPMN (VLR-V);
Visit Mobile Switch Center (VMSC);
VMSC from VPMN (VMSC-V);
HPMN Gateway MSC (GMSC-H);
Multimedia Messaging Service Center (MMSC);
Mobile Switch Center (MSC);
International Signal Gateway (ISG);
MAP Location Update (LUP);
MAP Insert Subscriber Data (ISD);
Provide Roaming Number (PRN);

Intelligent Network protocol (IN);
ISDN User Part (ISUP);
Signaling System 7 (SS7);
Signal Control and Connection Part (SCCP);
Mobility Application Part (MAP);
Push Access Protocol (PAP);
Push Proxy Gateway (PPG);
Transaction Capability Application Part (TCAP);
Called Party Address (CdPA);
Calling Party Address (CgPA);
Serving GPRS Support Node (SGSN);
Gateway GPRS Support Node (GGSN);
Send Routing Information For Short Message (SRI-SM);
Session Initiation Access Request (SIA);
Home Public Mobile Network (HPMN);
Visited Public Mobile Network (VPMN);
Mobile Subscriber ISDN (MSISDN);
Mobile Station Roaming Number (MSRN);
International Mobile Subscriber Identifier (IMSI);
Virtual Private Network (VPN);
Point-to-Point (PPTP)/Layer Tunneling Protocol (L2TP);
Operator Determined Barring (ODB);
Camel Subscription Information (CSI);
Circuit Switch Data (CSD);
Addressing Mode (AddrMode);
APN Operator Identifier (APN-OI);
HPLMN Access Point (HPLMN AP);
HPLMN APN Operator Identifier (derived from IMSI) (HPLMN-OI);
Determines PDP context subscription records that satisfy given condition (Number<condition>);
PDP address (PDPaddr);
Network-provided APN, subscription not verified (SelMode:=ChosenBySGSN);
MS-provided APN, subscription not verified (SelMode:=SentByMS);
MS or Network-provided APN, subscription verified (SelMode:=Subscribed);
Selection Mode (SelMode);
VPLMN Access Point (VPLMN AP);
VPLMN APN Operator Identifier or the APN Operator Identifier of an associated PLMN when the VPLMN is a shared network (VPLMN-OI);
Concatenation operation (+).

DETAILED DESCRIPTION

Systems and methods are provided herein that transfer Welcome Multimedia Messages ("MM") ("WMM") or Welcome Roaming Content ("WRC") to devices of inbound roamers. These systems and methods, collectively referred to herein as Inbound Roamer Multimedia Messaging Systems ("IRMMS"), transfer MMs to inbound roamers without involving components of the corresponding HPMN. The MMs include text messages, music clips, voice clips, video clips, photographs, and drawings, but are not so limited. Use of the IRMMS eliminates payment by a VPMN with which a subscriber is roaming to the subscriber's HPMN. The payment is eliminated because components of the HPMN (GGSN, WAP Gateway, MMSC, etc.) are not included in the transfer of the MMs by the VPMN to the subscriber's device. Thus, the charges typically incurred by the VPMN for transmission of free WMM/WRC sent to the inbound roamer via the HPMN are avoided.

The following description provides specific details for a thorough understanding of, and enabling description for, embodiments of the S. However, one skilled in the art will understand that the IRMMS may be practiced without these details. In other instances, well-known structures and functions have not been shown or described in detail to avoid unnecessarily obscuring the description of the embodiments of the IRMMS.

Terms such as handset, mobile station ("MS"), subscriber, user, etc., may herein be used interchangeably to indicate an actor that is registering with a network. These terms are used for convenience, but in fact, the actor that registers with the network could be any combination of hardware and software capable of registering on a wireless network, e.g., a personal digital assistant ("PDA") and/or personal computer ("PC").

FIG. 1 is a diagram of a communication system 100 that includes a VPMN that transfers MMs to inbound roamers 10 without involving components of the roamer's HPMN, under an embodiment. The subscriber 10 is a "home" subscriber from the perspective of the HPMN network operator. The subscriber 10 uses a handset or mobile device that communicates over a wireless network 30 with the VPMN through a number of components as appropriate to the network 30. The VPMN of an embodiment includes an Intelligent Roaming Probe ("IRB") that monitors various roaming links and detects inbound roamers. The VPMN also includes a Visited Mobile Switch Center ("VMSC"), a Multimedia Mobile Switching Center ("MMSC"), a Serving General Packet Radio Service ("GPRS") Support Node ("SGSN"), and a Wireless Application Protocol ("WAP") Gateway. The VPMN may also include one or more of a GMSC-V, an IRMG, a Signal Gateway ("SG"), a Home Location Register ("HLR-V"), and a Visited Location Register ("VLR-V") (not shown) to name a few.

The IRB of an embodiment is not limited to being hosted at the VPMN. Consequently, the communication system 100 of various alternative embodiments may include an IRB associated with at least one of the VPMN, the HPMN, and components of the network 10. Furthermore, the communication system 100 of various alternative embodiments may distribute functions of the IRB across one or more components of at least one of the VPMN, the HPMN, and the network 10.

The MMSC provides a store and forward facility for multimedia messages sent across a mobile network. The MMSC may also provide a formatting role to enable messages to be "optimized" to the receiving handsets capability.

The HPMN of an embodiment includes for example a Home Location Register ("HLR") along with a Gateway General Packet Radio Service ("GPRS") Support Node ("GGSN"). The HPMN of an embodiment may also include one or more of a GMSC-H, a Multimedia Mobile Switch Center ("MMSC"), an IRMG, a Signal Gateway ("SG"), an HLR-H, a VMSC-H, and a VLR-H (not shown).

Components of the VPMN and HPMN are coupled to communicate via one or more networks 20 that include for example an SS7 signaling network ("SS7 network"). The SS7 signaling is a Common Channel Signaling ("CCS") system defined by the International Telecommunications Union-Telecommunication Standardization Sector ("ITU-T"). The SS7 signaling is used in telecommunication networks and provides a suite of protocols which enables circuit and non circuit related information to be routed about and between networks. The protocols of SS7 signaling include but are not limited to Message Transfer Part ("MTP"), Signaling Connection Control Part ("SCCP"), and Integrated Service Digital Network ("ISDN") User Part ("ISUP").

The network 20 and/or network 30 may include service provider networks that include, for example, GSM service and/or other cellular service, VoIP service, and/or WiFi service, but the embodiment is not so limited. The VPMN couples to each of the networks 20 and 30 for information exchange via network or bus couplings as appropriate to the network type, where the couplings include at least one of wireless, wired, and hybrid wireless/wired couplings/connections. Further, the networks/network couplings can include any of a number of network types known in the art including, but not limited to, local area networks (LANs), metropolitan area networks (MANs), wide area networks (WANs), proprietary networks, backend networks, and the Internet.

The mobile devices 10 described herein include, for example, cellular telephones, PCs, portable computing devices, portable telephones, portable communication devices, subscriber devices or units, and PDAs. The mobile devices 10, which also may be referred to as "mobile communication devices," "portable communication devices" and "communication devices," can include all such devices and equivalents, and are not limited to communication devices that are wireless. The networks 20 and 30 described herein support the transfer of information including voice and data signals between the mobile devices and the operator or service provider systems via at least one of wireless couplings, wired couplings, and a combination of wireless/wired couplings using one or more communication protocols known in the art. The networks described herein can use at least one of Global System for Mobile Communications (GSM), General Packet Radio Service (GPRS), Code Division Multiple Access (CDMA), and Time Division Multiple Access (TDMA) communication protocols, for example, but are not so limited.

Referring to FIG. 1, the VPMN of an embodiment transfers or sends WMM/WRC to the inbound roamer at such time as the inbound roamer registers with the VPMN network. Based on the roamer's GPRS subscription information with respect to the VPMN network and the VPMN deployment option, the IRMMS of an embodiment supports provision of WMM/WRC to the inbound roamer under three scenarios but is not so limited.

Under a first scenario, the VPMN detects that the roamer has a GPRS roaming subscription and a MMSIWAP-push capable handset. The VPMN, in response, sends a WMM/WRC to the subscriber's handset via WAP push. The message is then retrieved by the handset.

Under a second scenario, the VPMN detects the roamer has a GPRS subscription and a MMS/WAP-push capable handset but no GPRS roaming relationship. The VPMN then transfers MMS/WAP/GPRS configurations to the handset via Over-The-Air ("OTA") provisioning ("OTAP") or configuration. The MMS/WAP/GPRS configurations configure the receiving handset to access WAP services over GPRS and to send/receive MMS messages. The VPMN then sends the roamer a WMM/WRC via WAP push. The message is then retrieved by the handset.

The MMS/WAP/GPRS configurations are provided by the IRB of an embodiment because, in order for mobile phone users to access services such as WAP, GPRS, and/or MMS on their provider's wireless network (HPMN), their handsets must first be configured with the required settings to enable access to the service. This information can be entered manually into the phone, but this is a complex process and the information being entered is very technical, making the entry of this data difficult and prone to error. The OTAP provides a mechanism for mobile phones to be configured via special binary SMS messages sent to the handset for example.

Under a third scenario, the VPMN detects the roamer has no GPRS subscription but does have a MMS/WAP-push capable handset. The VPMN then transfers MMS/WAP/ GPRS configurations to the handset via OTAP. The VPMN then sends the roamer WMM/WRC via WAP push. The message is then retrieved by the handset.

Under any of the first, second, and third scenarios, the VPMN may, in response to detecting the roamer, send an MMS alert if the handset is only MMS capable. The VPMN may, in response to detecting the roamer, send a WAP push alert if the handset is only WAP-push capable.

The MM provided to the handset by the VPMN can include, for example, a city map, a local information guide, a local music download site, a ring-tone download site, and anything that is offered via the internet. The roaming subscriber can navigate through information of the MM to retrieve further information. Roamers will not be charged for the first MM, however subsequent clicks on the MM content can be charged. Inbound roamers will be alerted if such charges are applied against their accounts.

The value proposition of the IRMMS for service providers or operators is the attraction of inbound roamers to their network with better service and content and the ability to charge the roamer for the subsequent URL usage. The operator can also charge the advertisers or sponsors for the MMS or content service. The value proposition to inbound roamers is that they get access to rich multimedia local content such as city guide, restaurant information, service guides, etc.

The IRMMS of an embodiment generally supports inbound roamers using the IRB deployed at the VPMN operator for example. The IRB monitors the roaming links of the VPMN for MAP transactions. The IRB intercepts GPRS roaming signaling messages and GPRS data packet messages so as to control select GPRS traffic on the VPMN without involving HPMN network elements.

When an inbound roamer registers at the VPMN operator, for example, the registration is detected by the IRB, and the IRB captures information of the registering roamer from various MAP transaction messages (e.g., LUP, ISD, CancelLoc, PurgeMS, RestoreData, etc.). The IRB in response issues UpdateGPRSLocation messages to check for the roamer's GPRS subscription status (if not available in cached information). The UpdateGPRSLocation message may have been monitored at the roaming links if the roaming device initiates itself, in which case the information will be stored in the cache. In so doing the IRB presents as an SGSN node on the SS7 side although the IRB has no GPRS packet capability.

The IRB of an embodiment may perform GPRS packet interception using a number of methods. For example, the IRB may use GPRS Tunnelling Protocol on the Gn interface (a GPRS interface located between the GPRS Support Nodes ("GSN")) and Gp interface (when the GGSN and the SGSN are located in different networks, they may be interconnected via the Gp interface, which provides similar functionality to that of the Gn interface, however the Gp interface includes extra security functionality based on mutual agreements between operators) in order to tunnel user data between different GSNs. The IRB of an embodiment supports both signalling and user data under one generic header and can be used with User Datagram Protocol ("UDP") or Transmission Control Protocol ("TCP") but is not so limited.

Depending on GPRS subscription status of an inbound roamer and the operator's deployment options, the IRB may use different approaches to provide the WMM/WRC and to support the corresponding billing to the receiving subscriber. As described above, these approaches include three scenarios under which the IRMMS supports provision of WMM/WRC to inbound roamers. Each of these scenarios is described below in turn.

Figure 2:
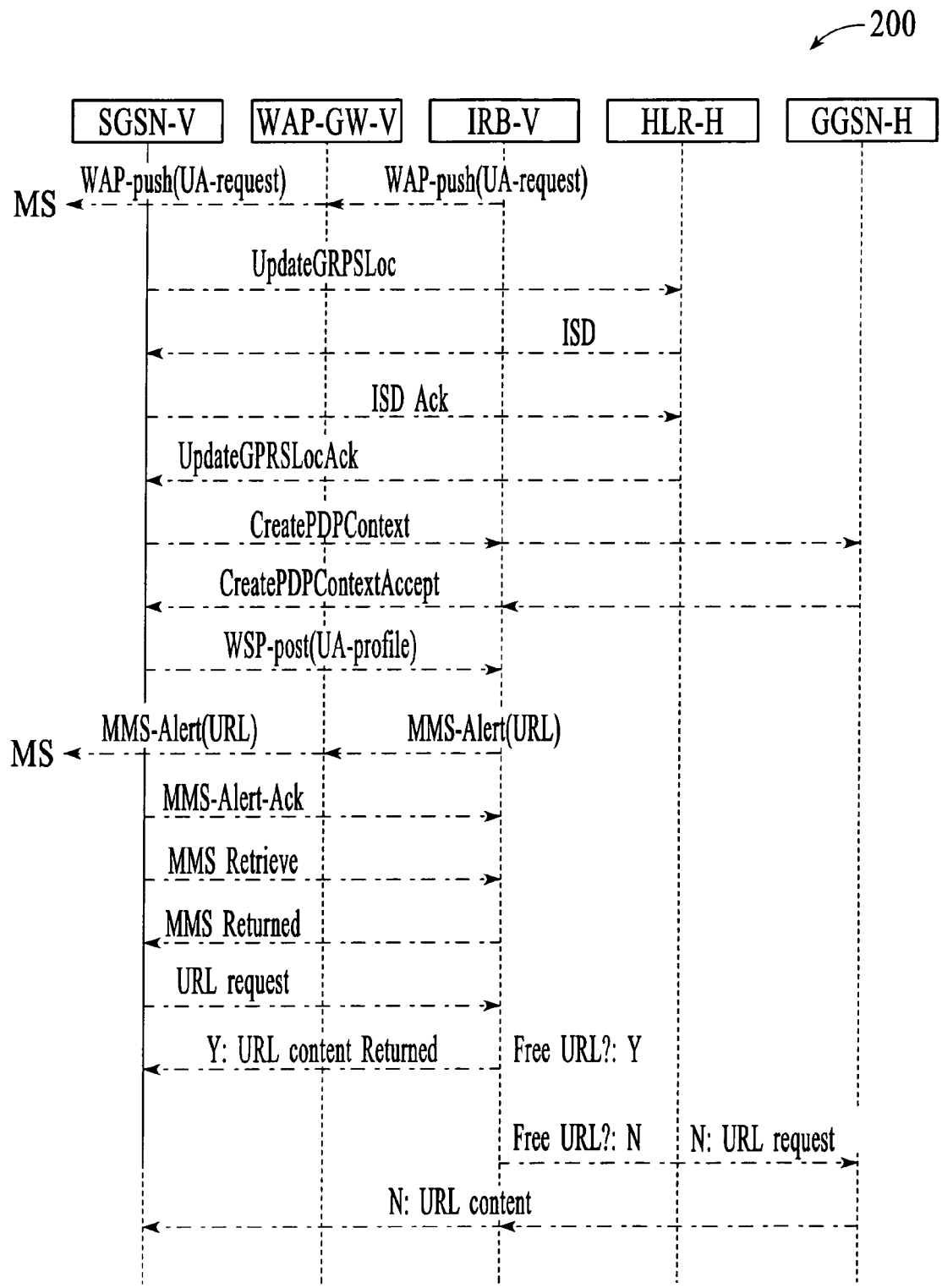
FIG. 2 is a signal flow diagram for providing WMM/WRC to inbound roamers, under an embodiment.

The IRB of an embodiment supports provision of WMM/WRC to inbound roamers upon detecting that the roamer has a GPRS roaming subscription and a MMS/WAP-push capable handset. FIG. 2 is a signal flow diagram 200 for providing WMM/WRC to inbound roamers, under an embodiment. With further reference to the host communication system 100, when the roamer has a GPRS subscription and is allowed to do GPRS roaming at the VPMN, a WAP push alert for the UA profile is sent to the handset by the IRB. This serves as a request for the handset to forward or send the handset device profile (URL) to the IRB. The handset responds with the UA-profile (URL) to indicate handset capabilities to the IRB. Since the UA profile is provided using the GPRS configuration (e.g., APN) and the WAP gateway information (e.g., home WAP gateway IP address) already in the handset after GPRS attach is successful, a create PDP context message (e.g., GPRS Tunneling Protocol-Control ("GTP-C") message) is established with the HPMN GGSN. This context creation message and subsequent PDP messages from the handset to the HPMN GGSN are intercepted by the IRB based on the GTP-C message at port 2123 and GPRS Tunneling Protocol-User ("GTP-U") message at port 2152 for version 1 GTP. In an embodiment in which version 0 GTP is used, then PDP messages on port 3386 are examined to separate GTP-C messages from GTP-U messages.

In describing GPRS-attach, in GPRS the mobile device is permanently attached to the network, providing a virtual connection without cost and data transfer (GPRS-Attach). The GPRS attach procedure is executed whenever a GPRS enabled MS is powered on and needs to inform the network about its presence. The two peers of a GPRS attach procedure are the MS and the Serving GPRS Support Node (SGSN).

Depending on the availability of the packet Common Control Channel (PCCCH), the GPRS attach procedure may be executed on Circuit Common Control Channel (CCCCH).

The GTP-C messages are control plane messages exchanged between GSNs in a signal path. The control plane messages are used to transfer GSN capability information between GSN pairs, to create, update and delete GTP tunnels and for path management.

The GTP-U messages are user plane messages exchanged between GSN pairs or GSN/Radio Network Controller ("RNC") pairs in a signal path. The user plane messages are used to carry user data packets and signaling messages for path management and error indication.

As an example, the IRB intercepts the PDP session and relays information to the HPMN GGSN for those packets for which the VPMN intends to charge, while mimicking the HPMN GGSN to intercept the packets or URLs that were offered to the roamer for free. The IRB of an embodiment therefore does not mimic the GGSN in order to stop PDP context creation at the HPMN GGSN because there is no way to determine at the time of context creation whether the context creation is triggered by the roamer or by the WMM/WRC. Also, the WMM/WRC might also ride on the existing GPRS session. Furthermore, the VPMN may only intend to offer free content to the roamer on the first content selection while charging fees to the roamer for subsequent access to content.

From the GTP-U message, WAP messages within the GTP tunnel at port 9201 (weak security WAP access mode) are further examined. From GTP-C message, when the PDP context creation messages are intercepted by the IRB, the IRB also records information that includes but is not limited to at least one of the tunnel ID, charging ID, IMSI, NSAPI, and HPMN GGSN IP address for later use.

When the UA profile of the handset indicates an MMS-capable handset, the IRB sends a MMS alert via PAP through a WAP push gateway to the handset. Since the push is an SIA request for a confirmed push, the handset response will include a GPRS attachment and PDP context activation. The data of the response again gets intercepted by the IRB. If the handset initiates MMS-retrieval of the MMS message, the request will reach the IRB which can then fetch the MMS content from MMSC or MMS content server. The IRB will then return the MMS message back to the handset.

If the handset UA profile does not indicate an MMS-capable handset, the IRB can send a WAP push URL instead. In this manner, the roamer can browse through a wireless markup language ("WML") menu with MMS-like content in the interaction.

When PDP messages are intercepted by the IRB, the IRB of an embodiment checks the URL of the message. The IRB maintains a list of URLs ("free list") to which access is free and without charge for the inbound roamers. If the intercepted URL is from the free list, then the IRB handles the request without sending the message to the HPMN GGSN. In this way, the HPMN GGSN will not have the billing record for this transaction. The IRB uses the previous information recorded on the tunnel ID and mimics the source IP address to be that of the HPMN GGSN address when returning PDP messages back to the VPMN SGSN. In this manner, even if the SGSN has built-in security checks on the HPMN GGSN, it is addressed properly.

Figure 3:
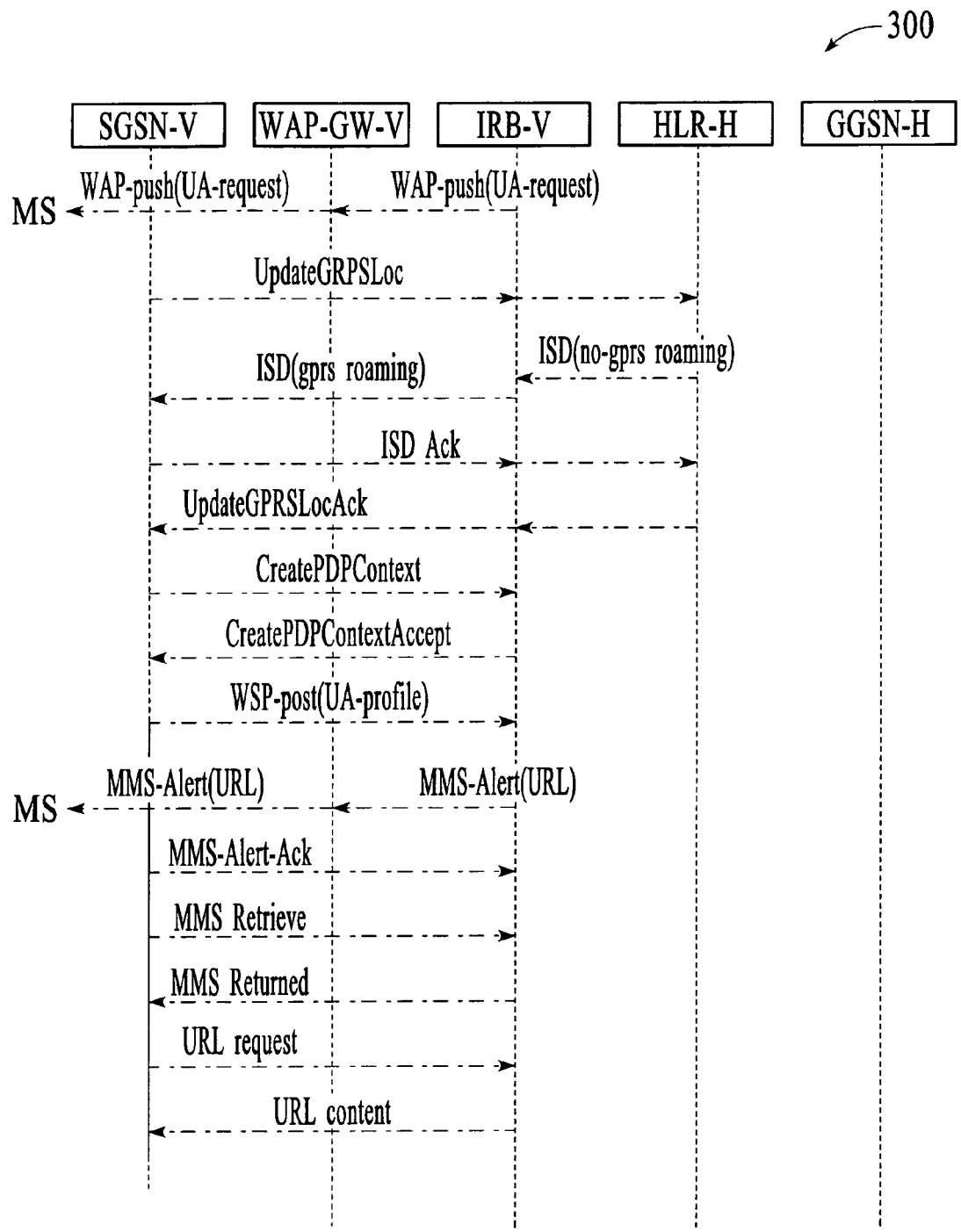
FIG. 3 is a signal flow diagram for providing WMM/WRC to inbound roamers in the absence of a GPRS roaming relationship, under an embodiment.

The IRB of an embodiment supports provision of WMM/WRC to inbound roamers upon detecting that the roamer has a GPRS roaming subscription and a MMS/WAP-push capable handset but is without a GPRS roaming relationship between the HPMN and the VPMN. FIG. 3 is a signal flow diagram 300 for providing WMM/WRC to inbound roamers in the absence of a GPRS roaming relationship, under an embodiment. Under this scenario, the VPMN detects the roamer has a GPRS subscription and a MMS/WAP-push capable handset but no GPRS roaming relationship. The VPMN in turn transfers MMS/WAP/GPRS configurations to the handset via OTAP. The VPMN then sends the roamer a WMM/WRC via WAP push. The message is then retrieved by the handset.

With reference to the host communication system 100 along with the signal flow diagram 300, the roamer has a GPRS subscription but in the absence of a GPRS roaming relationship is not allowed to perform GPRS roaming between the HPMN and VPMN. The VPMN of an embodiment, while allowing postpaid voice roaming, also offers GPRS roaming to inbound roamers from the HPMN in the absence of GPRS roaming relationships by allowing the VPMN to access the VPMN GPRS service. The VPMN provides this GPRS roaming by using the IRB to intercept the GPRS attach to allow VPMN access and a wild card Access Point Name ("APN") in the VPMN SGSN.

The VPMN operator's SGSN defines the APN to provide internet service and thus VPMN access for inbound roamers. This APN operates to select a VPMN GGSN using a Domain Name System ("DNS") for internet access. The APN provides routing information for SGSNs and GGSNs. The APN comprises two components including the network identification ("ID"), which identifies the external service requested by a use of the GPRS service, and the operator ID which specifies routing information.

The IRB also sends a WAP push alert to the handset for the UA profile, the alert requesting forwarding of the handset device profile URL to the IRB. The handset responds by forwarding the UA-profile URL to the IRB to indicate handset capabilities to the IRB. Since the UA profile is provided using the GPRS configuration (e.g., HPMN APN) and WAP gateway (e.g. HPMN WAP gateway IP address) information already in the handset after GPRS attach is successful, when the PDP context activation message is sent by the handset to the VPMN SGSN, the VPMN SGSN maps the APN to the VPMN GGSN.

Since the URL points to the IRB, the IP content will reach the IRB from the VPMN GGSN. There is no need to change any IP address or intercept PDP messages because the IRB is transparent to the GPRS transport.

The GPRS billing of an embodiment is done differently from GPRS TAP because the roamer's HPMN has no GPRS roaming relationships with the VPMN. The billing therefore includes filtering of the GPRS Call Detail Record ("CDR") using information of the roaming International Mobile Subscriber Identifier ("IMSI") with the Mobile Country Code ("MCC") and Mobile Network Code ("MNC") belonging to the HPMNs that do not have a GPRS roaming relationship with the VPMN.

The CDR is a database record unit used to create billing records. The CDR includes details such as the called and calling parties, originating switch, terminating switch, call length, and time of day. When applied to GPRS, CDRs are typically generated by the SGSN and GGSN, recording data volumes and Quality of Service ("QoS") rather than call time. These records are passed to the Charging Gateway Function ("CGF") for consolidation prior to being passed to the billing platform.

Figure 4:
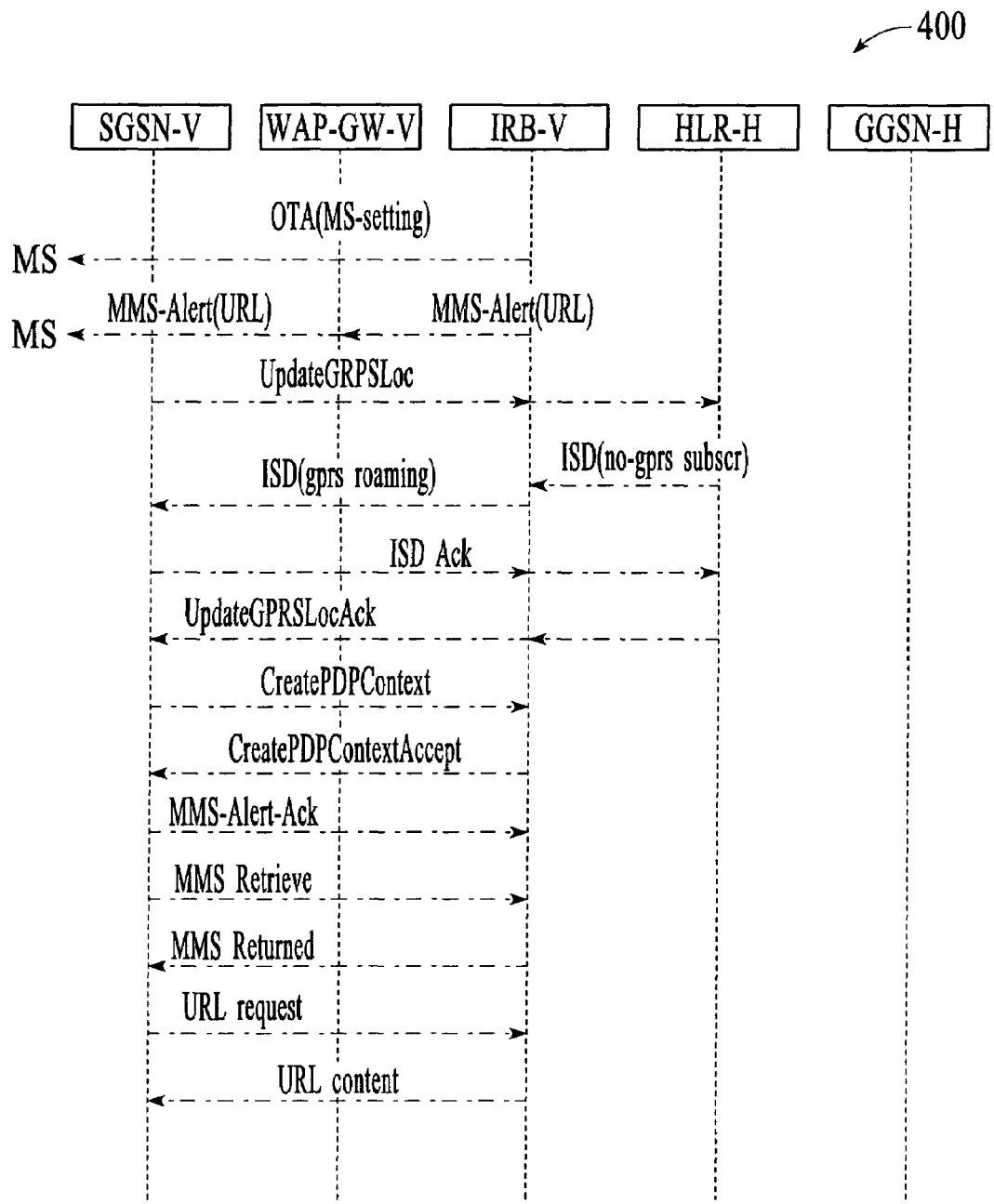
FIG. 4 is a signal flow diagram for providing WMM/WRC to inbound roamers in the absence of a GPRS roaming subscription, under an embodiment.
Figure 5:
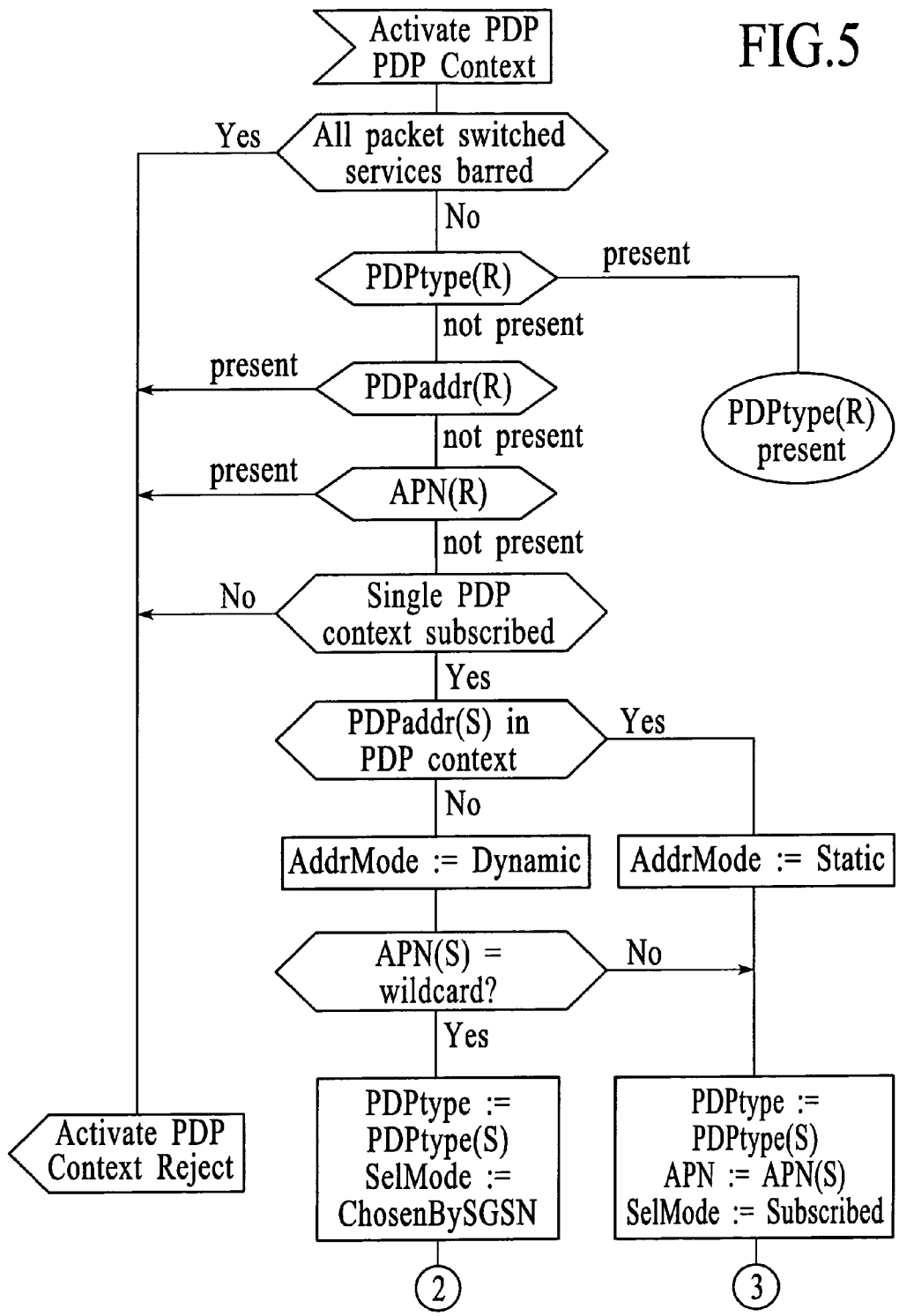
FIGS. 5-10 are Specification and Description Language ("SDL") diagrams for selection rules used to set the selection mode parameter, under an embodiment.
Figure 6:
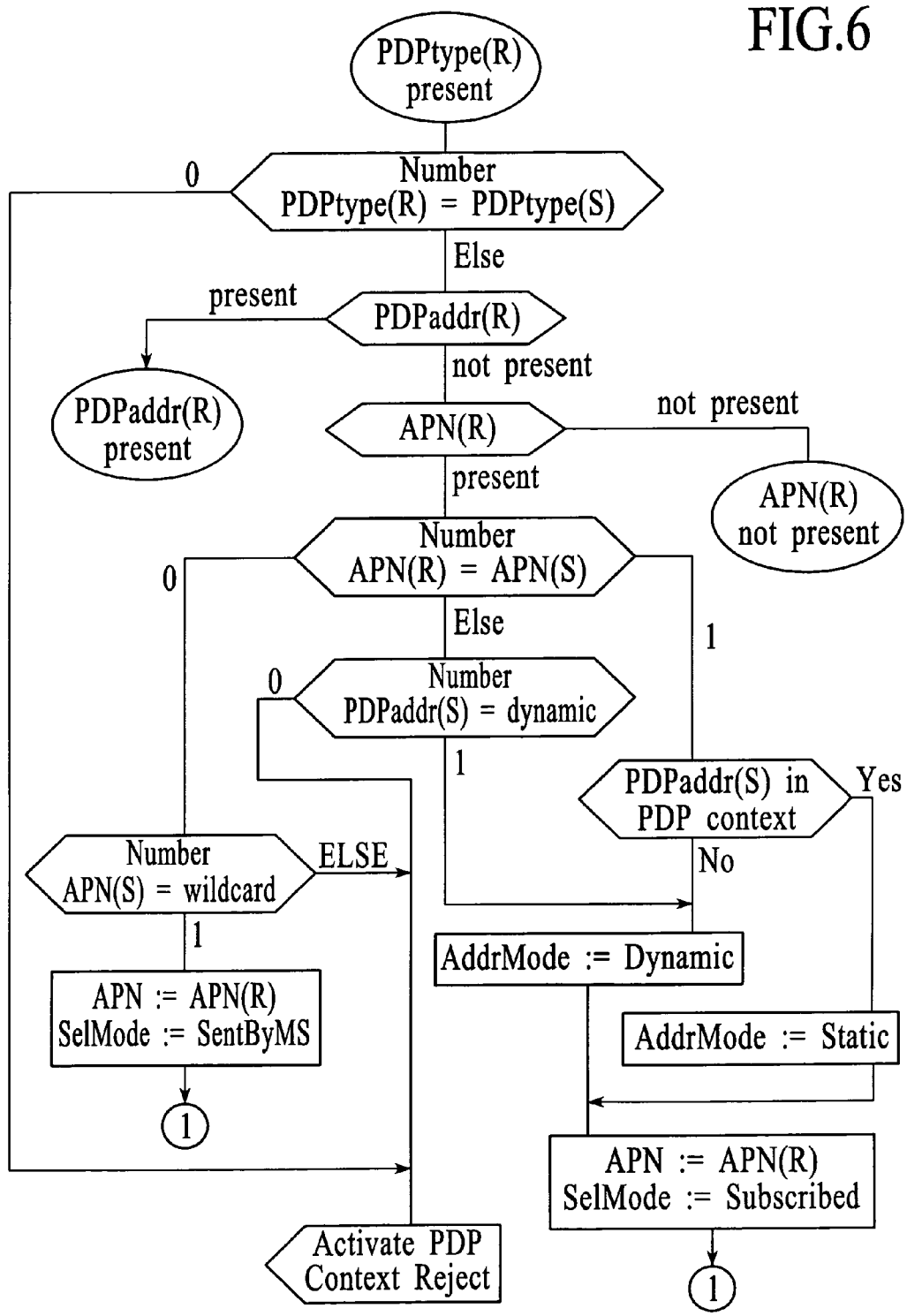
Figure 7:
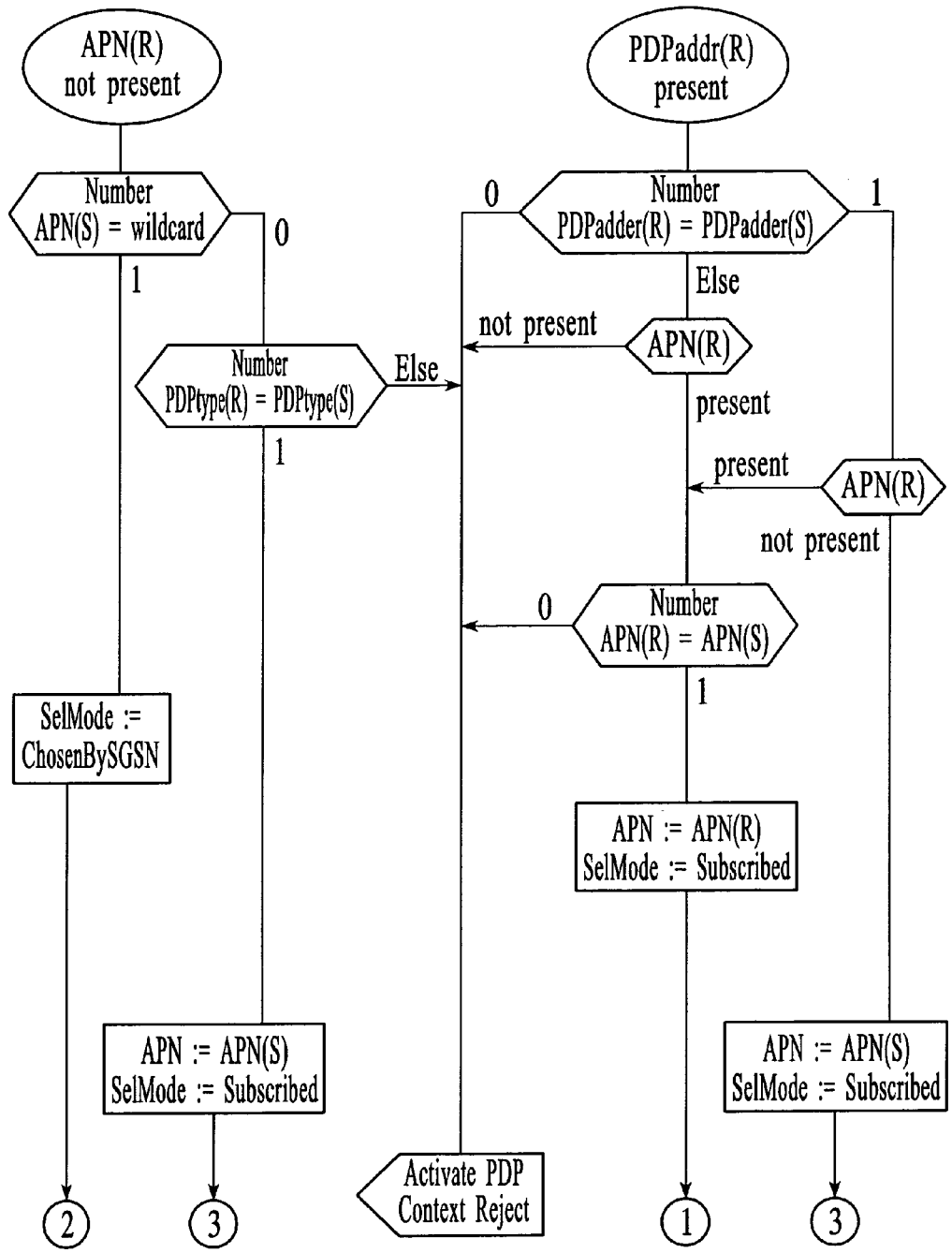
Figure 8:
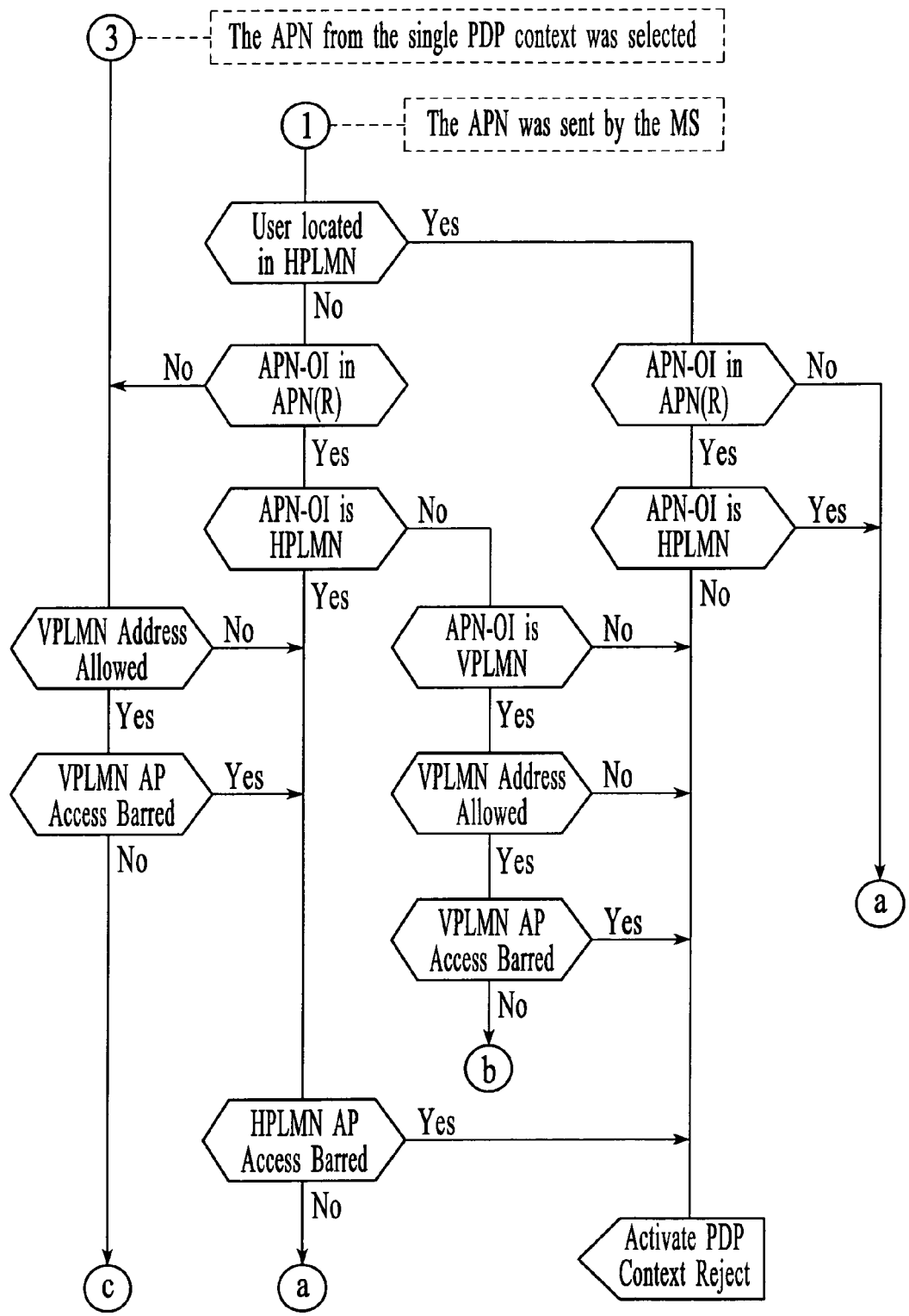
Figure 9:
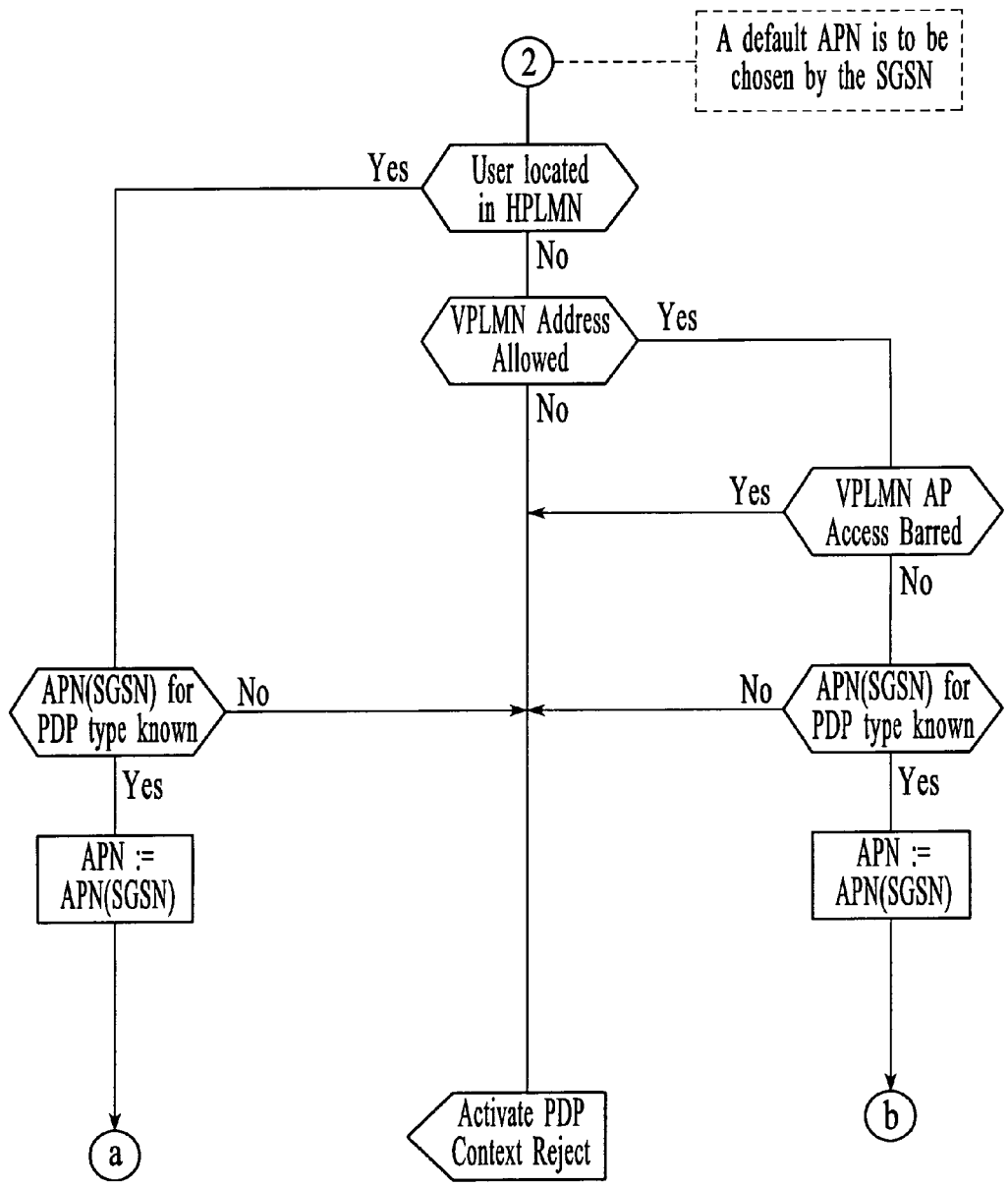
Figure 10:
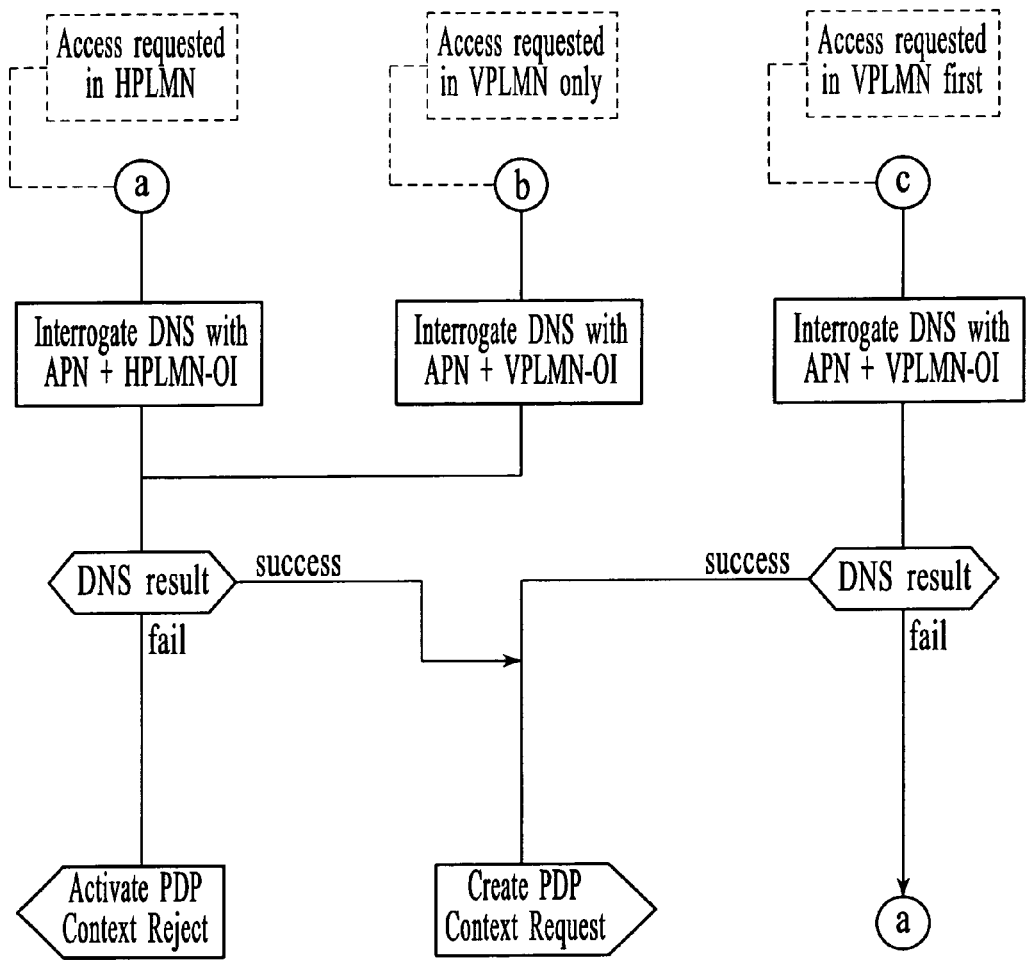

The IRB of an embodiment supports provision of WMM/WRC to inbound roamers upon detecting that the roamer has a MMS/WAP-push capable handset but is without a GPRS roaming subscription. FIG. 4 is a signal flow diagram 400 for providing WMM/WRC to inbound roamers in the absence of a GPRS roaming subscription, under an embodiment. Under this scenario, the VPMN detects the roamer has no GPRS subscription but does have a MMS/WAP-push capable handset. The VPMN then transfers MMS/WAP/GPRS configurations to the handset via OTAP. The VPMN then sends the roamer WMM/WRC via WAP push. The message is then retrieved by the handset.

With reference to the host communication system 100 and the signal flow diagram 400, the roamer does not have a GPRS subscription but does have postpaid voice roaming. The VPMN offers GPRS roaming to inbound roamers without GPRS roaming relationships, when the VPMN can provide International Mobile Equipment Identity ("IMEI") information (e.g., through Equipment Identity Register ("EIR"), through probing at the Abis interface (interface between the Base Transceiver Station ("BTS") and Base Station Controller ("BSC")), Gb interface (GPRS interface located between the SGSN and the Packet Control Unit ("PCU"), and/or through SGSN), by causing the IRB to transfer to the roamer's handset via an OTA coupling the GPRS configuration of a VPMN APN and the MMS/WAP configuration of a VPMN. The OTAP of the VPMN setting may not be used when the roamer has a GPRS subscription since this may deactivate the roamer's existing configurations which must be subsequently reset.

Because the OTAP depends on device recognition, there is no need for WAP push of the UA-profile request. Instead after the OTAP as described above, a WAP push alert for WMM/WRC or MMS alert is sent to the handset by the IRB. This WAP push alert requests the handset to acknowledge ("ack"). The handset responds to the ack using the VPMN GPRS configuration (e.g., APN) and WAP gateway (e.g., VPMN WAP gateway IP address) information already in the handset following the GPRS attach. The IRB of an embodiment intercepts the GPRS attach to allow VPMN access and a wild card APN in the VPMN SGSN. When the PDP context activation message is subsequently sent by the handset to the VPMN SGSN, the VPMN SGSN maps the APN to the VPMN GGSN. The IP/MMS content reaches the IRB from the VPMN GGSN because the MMS or WAP push URL is pointed to the IRB. Thus, there is no need to change any IP address or intercept PDP messages because the IRB is transparent to the GPRS transport.

In alternative embodiments, the OTAP described above can also be applied to inbound roamers that do not have GPRS roaming but that have a GPRS roaming relationship with the HPMN and VPMN.

For inbound roamers using GPRS roaming, the SGSN produces billing records for every roaming session. Since portions of the session's data volume may be provided free of charge, every roaming IMSI associated with an HPMN APN is examined to see if it includes free data content, and removes the free data content to generate the final GPRS CDR for TAP processing.

Regarding billing for inbound roamers having a GPRS subscription and GPRS roaming relationships between the HPMN and VPMN, the SGSN generates billing records for the GPRS sessions. The billing system or mediation system recognizes the roamer's IMSI (based on MCC and MNC) of these records as belonging to that of a non-GPRS inbound roamer. Once recognized, these records are billed in a special manner by the VPMN and are not billed by the normal MO-TAP for GPRS.

For inbound roamers without a GPRS subscription, when OTAP is used, the billing system or mediation system recognizes a record as belonging to that of special GPRS inbound roamers by looking at the VPMN APN. Once recognized, these records will not be billed by the normal MO-TAP for GPRS and are instead billed in a special manner by the VPMN.

The VPMN operator can bill the usage as a daily flat fee and send a value added service EVENT TAP record to the HPMN operator of the non-GPRS inbound roamer. The VPMN may also use the GPRS session time and bill it as a CSD duration.

Referring again to FIGS. 1-4 described above, the SGSN selects the APN for use in deriving the GGSN address, and sets the selection mode parameter according to a number of selection rules. FIGS. 5-10 are Specification and Description Language ("SDL") diagrams for selection rules used to set the selection mode parameter, under an embodiment. These rules are applied upon PDP context activation to determine the APN and the corresponding GGSN in the GPRS specification 360. SDL is an object-oriented, formal language defined by the International Telecommunications Union-Telecommunications Standardization Sector ("ITU-T"). The language is intended for the specification of complex, event driven, real time, and interactive applications involving many concurrent activities that communicate using discrete signals. The definitions that follow apply to the selection rules but the embodiment is not so limited.

The SGSN may know from the subscription data the parameters (S for Subscribed) that include PDP type (S), PDP address (S), APN (S), and VPLMN address allowed.

The SGSN may know from configuration the default APN supporting a given PDP type. This APN is called APN (SGSN) and does not include an APN Operator Identifier.

The SGSN knows the parameters requested by the MS (R for Requested) including PDP type (R), PDP address (R), and APN (R). APN (R) is the APN Network Identifier requested by the MS.

In case of "an APN chosen by the SGSN" the activated PDP context is linked with a dynamic PDP address.

An MS may have multiple subscription records for the same PDP type and the same PDP address, but with different APNs. An MS may have one or two subscription records with the same PDP type and the same APN, where one record has a static PDP address and one record has a dynamic PDP address.

When the MS is in its Home Public Land Mobile Network ("HPLMN"), and the MS requests an APN that does not correspond to any GGSN of the HPLMN, the request is rejected by the SGSN. When the MS is in a Visited Public Land Mobile Network ("VPLMN"), and the MS requests an APN that does not correspond to any GGSN of its HPLMN, the VPLMN, and any associated PLMN when the VPLMN is a shared network, the request is rejected by the SGSN.

If APN (S)=wild card (see GSM 03.03), then: (a) a default APN (a default PDN) is to be chosen by the SGSN (APN (SGSN)) if no APN (R) has been provided; or (b) a PDP context with dynamic PDP address may be activated towards any APN requested by the MS.

In order to derive APN (R) from the APN sent by the MS, the SGSN determines if the APN sent by the user ends with ".gprs". If not, then APN (R) is equal to APN sent by the MS. If yes, then APN (R) is the APN sent by the MS without the three last labels. When the APN sent by the user ends with ".gprs" then the APN-OI is saved for later use.

The IMMS of an embodiment includes a system comprising at least one of a visited network coupled to a home network, and a roaming system coupled to the visited network, wherein the roaming system monitors at least one roaming link, detects registration of a mobile station with the visited network, receives at the visited network identification information of the mobile station, the identification information including a subscription status of at least one service, and provides the mobile station with access to multimedia messaging services (MMS) via at least one component of the visited network, wherein the access is in accordance with the subscription status and exclusive of components of a home network of the mobile station.

The visited network of an embodiment is a cellular network.

Receiving information of the mobile station of an embodiment comprises receiving information from Mobile Application Part (MAP) transaction messages between the mobile station and at least one of the visited network and the home network The mobile station of an embodiment includes at least one of a cellular telephone, personal computer, portable computing device, portable telephone, portable communication device, subscriber device, and personal digital assistant.

The service of an embodiment includes General Packet Radio Service (GPRS).

The identification information of an embodiment further includes capabilities of the mobile station.

The subscription status of an embodiment includes at least one of presence of a General Packet Radio Service (GPRS) subscription, absence of the GPRS subscription, presence of a General Packet Radio Service (GPRS) roaming relationship between the visited network and the home network, and absence of the GPRS roaming relationship.

The roaming system of an embodiment providing the mobile station with access to the MMS further comprises at least one of requesting a profile of the mobile station, receiving the profile, and determining capabilities of the mobile station in response to information of the profile.

The roaming system of an embodiment providing the mobile station with access to the MMS further comprises at least one of intercepting a packet data protocol (PDP) session between the mobile station and the home network, and identifying from information of the intercepted PDP session a request for access to at least one of a first set of MMS content and a second set of MMS content. Providing of an embodiment may further comprise mimicking at least one component of the home network to provide access to at least one uniform resource locator (URL) of the first set of MMS content when the request is for access to the first set of MMS content. Providing of an embodiment may further comprise relaying information of the PDP session to the home network to provide access to at least one uniform resource locator (URL) of the second set of MMS content when the request is for access to the second set of MMS content.

Providing the mobile station with access to the MMS of an embodiment further comprises at least one of transferring at least one communication configuration to the mobile station from the visited network, the communication configuration corresponding to the visited network, and defining a communication routing at a component of the visited network, the communication routing controlling routing through at least one component of the visited network of a request for access to at least one of a first set of MMS content and a second set of MMS content. Providing of an embodiment may further comprise at least one of transferring a request from the visited network to the mobile station for a device profile URL of the mobile station, and receiving the device profile URL at the visited network from the mobile station. The communication configuration of an embodiment includes at least one of an MMS, wireless application protocol (WAP), and GPRS configuration.

The roaming system of an embodiment providing the mobile station with access to the MMS further comprises at least one of transferring at least one communication configuration to the mobile station from the visited network, the communication configuration corresponding to the visited network, receiving an acknowledge message from the mobile station in response to the transferring, and defining a communication routing at a component of the visited network, the communication routing controlling routing through at least one component of the visited network of a request for access to at least one of a first set of MMS content and a second set of MMS content.

The IRMMS of an embodiment includes a device comprising at least one of a monitor that monitors at least one roaming link, a detector coupled to the monitor for detecting registration of the mobile station with a visited network, a receiver coupled to the visited network that receives identification information of the mobile station, the identification information including a subscription status of at least one service, and a node coupled to the visited network that provides the mobile station with access to multimedia messaging services (MMS) via at least one component of the visited network, wherein the access is in accordance with the subscription status and exclusive of components of a home network of the mobile station.

The service of an embodiment includes General Packet Radio Service (GPRS).

The subscription status of an embodiment includes at least one of presence of a General Packet Radio Service (GPRS) subscription and presence of a General Packet Radio Service (GPRS) roaming relationship between the visited network and the home network.

Providing the mobile station with access to the MMS the node of an embodiment further comprises at least one of requests a profile of the mobile station, receives the profile, and determines capabilities of the mobile station in response to information of the profile.

The node of an embodiment may intercept a packet data protocol (PDP) session between the mobile station and the home network, and/or identify from information of the intercepted PDP session a request for access to at least one of a first set of MMS content and a second set of MMS content. The node of an embodiment mimics at least one component of the home network to provide access to at least one uniform resource locator (URL) of the first set of MMS content when the request is for access to the first set of MMS content. The node of an embodiment relays information of the PDP session to the home network to provide access to at least one uniform resource locator (URL) of the second set of MMS content when the request is for access to the second set of MMS content.

Providing the mobile station with access to MMS the node of an embodiment includes at least one of transferring at least one communication configuration to the mobile station from the visited network, the communication configuration corresponding to the visited network, and defining a communication routing at a component of the visited network, the communication routing controlling routing through at least one component of the visited network of a request for access to at least one of a first set of MMS content and a second set of MMS content. The node of an embodiment transfers a request from the visited network to the mobile station for a device profile URL of the mobile station, and receives the device profile URL from the mobile station. The communication configuration of an embodiment includes at least one of an MMS, wireless application protocol (WAP), and GPRS configuration.

Providing the mobile station of an embodiment with access to MMS the node further comprises at least one of transferring at least one communication configuration to the mobile station from the visited network, the communication configuration corresponding to the visited network, receiving an acknowledge message from the mobile station in response to the transferring, and defining a communication routing at a component of the visited network, the communication routing controlling routing through at least one component of the visited network of a request for access to at least one of a first set of MMS content and a second set of MMS content.

The IRMMS of an embodiment includes a device comprising at least one of means for monitoring at least one roaming link, means for detecting through the monitoring registration of the mobile station with a visited network, means for receiving at the visited network identification information of the mobile station, the identification information including a subscription status of at least one service, and means for providing the mobile station with access to multimedia messaging services (MMS) via at least one component of the visited network, wherein the access is in accordance with the subscription status and exclusive of components of a home network of the mobile station.

The IRMMS of an embodiment includes a method comprising at least one of monitoring at least one roaming link, detecting through the monitoring registration of the mobile station with a visited network, receiving at the visited network identification information of the mobile station, the identification information including a subscription status of at least one service, and providing the mobile station with access to multimedia messaging services (MMS) via at least one component of the visited network, wherein the access is in accordance with the subscription status and exclusive of components of a home network of the mobile station.

The service of an embodiment includes General Packet Radio Service (GPRS).

The identification information of an embodiment further includes capabilities of the mobile station.

The subscription status of an embodiment includes at least one of presence of a General Packet Radio Service (GPRS) subscription and absence of the GPRS subscription.

The subscription status of an embodiment includes at least one of presence of a General Packet Radio Service (GPRS) roaming relationship between the visited network and the home network and absence of the GPRS roaming relationship.

Providing the mobile station with access to the MMS further comprises at least one of requesting a profile of the mobile station, receiving the profile, and determining capabilities of the mobile station in response to information of the profile.

Providing the mobile station with access to the MMS further comprises at least one of intercepting a packet data protocol (PDP) session between the mobile station and the home network, and identifying from information of the intercepted PDP session a request for access to at least one of a first set of MMS content and a second set of MMS content. The method of an embodiment further comprises mimicking at least one component of the home network to provide access to at least one uniform resource locator (URL) of the first set of MMS content when the request is for access to the first set of MMS content. The method of an embodiment further comprises relaying information of the PDP session to the home network to provide access to at least one uniform resource locator (URL) of the second set of MMS content when the request is for access to the second set of MMS content. The first set of MMS content of an embodiment includes MMS content the visited network provides to the mobile station free of charge. The second set of MMS content of an embodiment includes MMS content the visited network provides to the mobile station free of charge.

The subscription status of an embodiment includes a General Packet Radio Service (GPRS) subscription and a GPRS roaming relationship between the visited network and the home network.

Providing the mobile station with access to MMS further comprises at least one of transferring at least one communication configuration to the mobile station from the visited network, the communication configuration corresponding to the visited network, and defining a communication routing at a component of the visited network, the communication routing controlling routing through at least one component of the visited network of a request for access to at least one of a first set of MMS content and a second set of MMS content. The first set of MMS content of an embodiment includes MMS content the visited network provides to the mobile station free of charge and the second set of MMS content includes MMS content the visited network provides to the mobile station free of charge, the MMS content further including at least one uniform resource locator (URL). The method of an embodiment further comprises at least one of transferring a request from the visited network to the mobile station for a device profile URL of the mobile station, and receiving the device profile URL at the visited network from the mobile station. The communication configuration of an embodiment includes at least one of an MMS, wireless application protocol (WAP), and GPRS configuration, wherein transfer of the communication configuration is via over-the-air provisioning (OTAP). The subscription status of an embodiment includes a General Packet Radio Service (GPRS) roaming subscription without a GPRS roaming relationship between the visited network and the home network.

Providing the mobile station of an embodiment with access to MMS further comprises at least one of transferring at least one communication configuration to the mobile station from the visited network, the communication configuration corresponding to the visited network, receiving an acknowledge message from the mobile station in response to the transferring, and defining a communication routing at a component of the visited network, the communication routing controlling routing through at least one component of the visited network of a request for access to at least one of a first set of MMS content and a second set of MMS content.

The components of the IRMMS described above include any collection of computing components and devices operating together. The components of the IRMMS can also be components or subsystems within a larger computer system or network. The IRMMS components can also be coupled among any number of components (not shown), for example other buses, controllers, memory devices, and data input/output (I/O) devices, in any number of combinations. Further, functions of the IRMMS can be distributed among any number/combination of other processor-based components.

Aspects of the IRMMS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IRMMS include: microcontrollers with memory (such as electronically erasable programmable read only memory (EEPROM)), embedded microprocessors, firmware, software, etc. Furthermore, aspects of the IRMMS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the IRMMS is not intended to be exhaustive or to limit the IRMMS to the precise form disclosed. While specific embodiments of, and examples for, the IRMMS are described herein for illustrative purposes, various equivalent modifications are possible within the scope of the IRMMS, as those skilled in the relevant art will recognize. The teachings of the IRMMS provided herein can be applied to other processing systems and methods, not only for the systems and methods described above.

The elements and acts of the various embodiments described above can be combined to provide further embodiments. These and other changes can be made to the IRMMS in light of the above detailed description.

In general, in the following claims, the terms used should not be construed to limit the IRMMS to the specific embodiments disclosed in the specification and the claims, but should be construed to include all processing systems that operate under the claims. Accordingly, the IRMMS is not limited by the disclosure, but instead the scope of the IRMMS is to be determined entirely by the claims.

While certain aspects of the IRMMS are presented below in certain claim forms, the inventors contemplate the various aspects of the IRMMS in any number of claim forms. Accordingly, the inventors reserve the right to add additional claims after filing the application to pursue such additional claim forms for other aspects of the IRMMS.

What is claimed is:

1. A system comprising:
a visited network coupled to a home network; and
a roaming system coupled to the visited network, wherein the roaming system monitors at least one roaming link, detects registration of a mobile station with the visited network, receives at the visited network identification information of the mobile station, the identification information including a subscription status of at least one service, intercepts a packet data protocol (PDP) session between the mobile station and the home network, identifies from information of the intercepted PDP session a request for access to at least one of a first set of multimedia messaging services (MMS) content and a second set of MMS content, and provides the mobile station with access to at least one of the first and second MMS contents via at least one component of the visited network, wherein the access is in accordance with the subscription status and exclusive of components of a home network of the mobile station.

2. The system of claim 1, wherein the visited network is a cellular network.

3. The system of claim 1, wherein receiving information of the mobile station comprises receiving information from Mobile Application Part (MAP) transaction messages between the mobile station and at least one of the visited network and the home network.

4. The system of claim 1, wherein the mobile station includes at least one of a cellular telephone, personal computer, portable computing device, portable telephone, portable communication device, subscriber device, and personal digital assistant.

5. The system of claim 1, wherein the at least one service includes General Packet Radio Service (GPRS).

6. The system of claim 1, wherein the identification information further includes capabilities of the mobile station.

7. The system of claim 1, wherein the subscription status includes at least one of presence of a General Packet Radio Service (GPRS) subscription, absence of the GPRS subscription, presence of a General Packet Radio Service (GPRS) roaming relationship between the visited network and the home network, and absence of the GPRS roaming relationship.

8. The system of claim 1, wherein the roaming system providing the mobile station with access to the MMS further comprises:
   requesting a profile of the mobile station;
   receiving the profile; and
   determining capabilities of the mobile station in response to information of the profile.

9. The system of claim 1, further comprising mimicking at least one component of the home network to provide access to at least one uniform resource locator (URL) of the first set of MMS content when the request is for access to the first set of MMS content.

10. The system of claim 1, further comprising relaying information of the PDP session to the home network to provide access to at least one uniform resource locator (URL) of the second set of MMS content when the request is for access to the second set of MMS content.

11. The system of claim 1, wherein the roaming system providing the mobile station with access to the MMS further comprises:
   transferring at least one communication configuration to the mobile station from the visited network, the communication configuration corresponding to the visited network; and
   defining a communication routing at a component of the visited network, the communication routing controlling routing through at least one component of the visited network of a request for access to at least one of a first set of MMS content and a second set of MMS content.

12. The system of claim 11, further comprising:
   transferring a request from the visited network to the mobile station for a device profile UFRL of the mobile station; and
   receiving the device profile URL at the visited network from the mobile station.

13. The system of claim 11, wherein the communication configuration includes at least one of an MMS, wireless application protocol (WAP), and GPRS configuration.

14. The system of claim 1, wherein the roaming system providing the mobile station with access to the MMS further comprises:
   transferring at least one communication configuration to the mobile station from the visited network, the communication configuration corresponding to the visited network;
   receiving an acknowledge message from the mobile station in response to the transferring; and
   defining a communication routing at a component of the visited network, the communication routing controlling routing through at least one component of the visited network of a request for access to at least one of a first set of MMS content and a second set of MMS content.

15. A system comprising:
   a monitor that monitors at least one roaming link;
   a detector coupled to the monitor for detecting registration of the mobile station with a visited network;
   a receiver coupled to the visited network that receives identification information of the mobile station, the identification information including a subscription status of at least one service; and
   a node coupled to the visited network that intercepts a packet data protocol (PDP) session between the mobile station and the home network, identifies from information of the intercepted PDP session a request for access to at least one of a first set of multimedia messaging services (MMS) content and a second set of MMS content, and provides the mobile station with access to at least one of the first and second sets of MMS content via at least one component of the visited network, wherein the access is in accordance with the subscription status and exclusive of components of a home network of the mobile station.

16. The system of claim 15, wherein the at least one service includes General Packet Radio Service (GPRS).

17. The system of claim 15, wherein the subscription status includes at least one of presence of a General Packet Radio Service (GPRS) subscription and presence of a General Packet Radio Service (GPRS) roaming relationship between the visited network and the home network.

18. The system of claim 15, wherein in providing the mobile station with access to the MMS the node:
   requests a profile of the mobile station;
   receives the profile; and
   determines capabilities of the mobile station in response to information of the profile.

19. The system of claim 15, wherein the node mimics at least one component of the home network to provide access to at least one uniform resource locator (URL) of the first set of MMS content when the request is for access to the first set of MMS content.

20. The system of claim 15, wherein the node relays information of the PDP session to the home network to provide access to at least one uniform resource locator (URL) of the second set of MMS content when the request is for access to the second set of MMS content.

21. The system of claim 15, wherein in providing the mobile station with access to MMS the node:
   transfers at least one communication configuration to the mobile station from the visited network, the communication configuration corresponding to the visited network; and
   defines a communication routing at a component of the visited network, the communication routing controlling routing through at least one component of the visited network of a request for access to at least one of a first set of MMS content and a second set of MMS content.

22. The system of claim 21, wherein the node:
transfers a request from the visited network to the mobile station for a device profile URL of the mobile station; and
receives the device profile URL from the mobile station.

23. The system of claim 21, wherein the communication configuration includes at least one of an MMS, wireless application protocol (WAP), and GPRS configuration.

24. The system of claim 15, wherein in providing the mobile station with access to MMS the node:
transfers at least one communication configuration to the mobile station from the visited network, the communication configuration corresponding to the visited network;
receives an acknowledge message from the mobile station in response to the transferring; and
defines a communication routing at a component of the visited network, the communication routing controlling routing through at least one component of the visited network of a request for access to at least one of a first set of MMS content and a second set of MMS content.

25. A system comprising:
means for monitoring at least one roaming link;
means for detecting through the monitoring registration of the mobile station with a visited network;
means for receiving at the visited network identification information of the mobile station, the identification information including a subscription status of at least one service;
means for intercepting a packet data protocol (PDP) session between the mobile station and the home network;
means for identifying from information of the intercepted PDP session a request for access to at least one of a first set of multimedia messaging services (MMS) content and a second set of MMS content; and
means for providing the mobile station with access to at least one of the first and second MMS contents via at least one component of the visited network, wherein the access is in accordance with the subscription status and exclusive of components of a home network of the mobile station.

26. A method comprising:
monitoring at least one roaming link;
detecting through the monitoring registration of a mobile station with a visited network;
receiving at the visited network identification information of the mobile station, the identification information including a subscription status of at least one service; and
intercepting a packet data protocol (PDP) session between the mobile station and the home network;
identifying from information of the intercepted PDP session a request for access to at least one of a first set of multimedia messaging services (MMS) content and a second set of MMS content; and
providing the mobile station with access to at least one of the first and second MMS contents via at least one component of the visited network, wherein the access is in accordance with the subscription status and exclusive of components of a home network of the mobile station.

27. The method of claim 26, wherein the at least one service includes General Packet Radio Service (GPRS).

28. The method of claim 26, wherein the identification information further includes capabilities of the mobile station.

29. The method of claim 26, wherein the subscription status includes at least one of presence of a General Packet Radio Service (GPRS) subscription and absence of the GPRS subscription.

30. The method of claim 26, wherein the subscription status includes at least one of presence of a General Packet Radio Service (GPRS) roaming relationship between the visited network and the home network and absence of the GPRS roaming relationship.

31. The method of claim 26, wherein providing the mobile station with access to the MMS further comprises:
requesting a profile of the mobile station;
receiving the profile; and
determining capabilities of the mobile station in response to information of the profile.

32. The method of claim 26, further comprising mimicking at least one component of the home network to provide access to at least one uniform resource locator (URL) of the first set of MMS content when the request is for access to the first set of MMS content.

33. The method of claim 26, further comprising relaying information of the PDP session to the home network to provide access to at least one uniform resource locator (URL) of the second set of MMS content when the request is for access to the second set of MMS content.

34. The method of claim 26, wherein the first set of MMS content includes MMS content the visited network provides to the mobile station free of charge.

35. The method of claim 26, wherein the second set of MMS content includes MMS content the visited network provides to the mobile station free of charge.

36. The method of claim 26, wherein the subscription status of the mobile device includes a General Packet Radio Service (GPRS) subscription and a GPRS roaming relationship between the visited network and the home network.

37. The method of claim 26, wherein providing the mobile station with access to MMS further comprises:
transferring at least one communication configuration to the mobile station from the visited network, the communication configuration corresponding to the visited network; and
defining a communication routing at a component of the visited network, the communication routing controlling routing through at least one component of the visited network of a request for access to at least one of a first set of MMS content and a second set of MMS content.

38. The method of claim 37, further comprising:
transferring a request from the visited network to the mobile station for a device profile URL of the mobile station; and
receiving the device profile URL at the visited network from the mobile station.

39. The method of claim 37, wherein the communication configuration includes at least one of an MMS, wireless application protocol (WAP), and GPRS configuration, wherein transfer of the communication configuration is via over-the-air provisioning (OTAP).

40. The method of claim 37, wherein the subscription status of the mobile device includes a General Packet Radio Service (GPRS) roaming subscription without a GPRS roaming relationship between the visited network and the home network.

41. The method of claim 26, wherein providing the mobile station with access to MMS further comprises:

transferring at least one communication configuration to the mobile station from the visited network, the communication configuration corresponding to the visited network;

receiving an acknowledge message from the mobile station in response to the transferring; and defining a communication routing at a component of the visited network, the communication routing controlling routing through at least one component of the visited network of a request for access to at least one of a first set of MMS content and a second set of MMS content.

42. A method comprising:

monitoring at least one roaming link;

detecting through the monitoring registration of mobile station with a visited network;

receiving at the visited network identification information of the mobile station, the identification information including a subscription status of at least one service;

transferring at least one communication configuration to the mobile station from the visited network, the communication configuration corresponding to the visited network;

defining a communication routing at a component of the visited network, the communication routing controlling routing through at least one component of the visited network of a request for access to at least one of a first set of multimedia messaging services (MMS) content and a second set of MMS content; and providing the mobile station with access to at least one of the first and second MMS contents via at least one component of the visited network, wherein the access is in accordance with the subscription status and exclusive of components of a home network of the mobile station, and wherein the first set of MMS content includes MMS content the visited network provides to the mobile station free of charge and the second set of MMS content includes MMS content the visited network provides to the mobile station free of charge, the MMS content further including at least one uniform resource locator (URL).

* * * * *